United States Patent
Diemer

(10) Patent No.: US 6,306,298 B1
(45) Date of Patent: Oct. 23, 2001

(54) FILTER MODULE

(75) Inventor: Wolfgang Diemer, Waldstetten (DE)

(73) Assignee: Seitz-Schenk Filtersystems GmbH, Bad Kreuznach (DE)

( * ) Notice: Subject to any disclaimer, the term of this patent is extended or adjusted under 35 U.S.C. 154(b) by 0 days.

(21) Appl. No.: 09/509,963

(22) PCT Filed: Sep. 29, 1998

(86) PCT No.: PCT/EP98/06160

§ 371 Date: Apr. 3, 2000

§ 102(e) Date: Apr. 3, 2000

(87) PCT Pub. No.: WO99/19041

PCT Pub. Date: Apr. 22, 1999

(30) Foreign Application Priority Data

Oct. 9, 1997 (DE) ............................................. 197 44 574

(51) Int. Cl.⁷ ............................. B01D 25/02; B01D 29/41
(52) U.S. Cl. ........................... 210/232; 210/450; 55/484; 55/502
(58) Field of Search ................................. 210/323.1, 437, 210/232, 347, 450; 55/484, 502

(56) References Cited

U.S. PATENT DOCUMENTS

| | | |
|---|---|---|
| 2,313,307 | 3/1943 | Wilkinson . |
| 3,246,920 | 4/1966 | Pall ...................................... 285/237 |
| 4,559,138 | 12/1985 | Harms, II ............................. 210/316 |
| 4,707,262 | 11/1987 | Murken ................................ 210/448 |
| 4,750,765 | 6/1988 | Cassidy et al. ...................... 285/321 |
| 5,055,192 | 10/1991 | Artinyan et al. ..................... 210/346 |
| 5,141,637 | * 8/1992 | Reed et al. ........................... 210/232 |
| 5,261,934 | 11/1993 | Shutie et al. ......................... 55/498 |
| 5,435,915 | 7/1995 | Connors, Jr. ......................... 210/232 |
| 5,482,624 | 1/1996 | Swiatek et al. ...................... 210/238 |
| 5,601,711 | 2/1997 | Sklar et al. ........................... 210/238 |
| 5,882,511 | * 3/1999 | Blomquist ............................ 210/232 |

FOREIGN PATENT DOCUMENTS

| | | |
|---|---|---|
| 37 41 552 | 6/1989 | (DE) . |
| 40 26 934 | 3/1992 | (DE) . |
| 295 20 418 | 3/1996 | (DE) . |
| 0 249 395 | 12/1987 | (EP) . |
| 0 563 380 | 10/1993 | (EP) . |

* cited by examiner

Primary Examiner—David A. Simmons
Assistant Examiner—Frank M. Lawrence
(74) Attorney, Agent, or Firm—Gudrun E. Huckett

(57) ABSTRACT

A filter module has several discoid filter cells each having a central opening and stacked to form a stacked filter cell arrangement, wherein the central openings are aligned in the axial direction of the stacked filter cell arrangement. Closing rings are connected to opposed ends of the stacked filter cell arrangement and have a central opening aligned with the central openings of the filter cells. At least one tensile forces receiving element extends through the central openings of the filter cells and the closing rings and has axial ends connected to the closing rings. The closing rings have outwardly facing end faces each having a flat packing. Adaptors having a hollow-cylindrical portion and having an axial sealing surface are provided and are connectable to a further liquid-conveying component. The adaptors are connected to the closing rings such that the sealing surface presses axially against the flat packing.

18 Claims, 5 Drawing Sheets

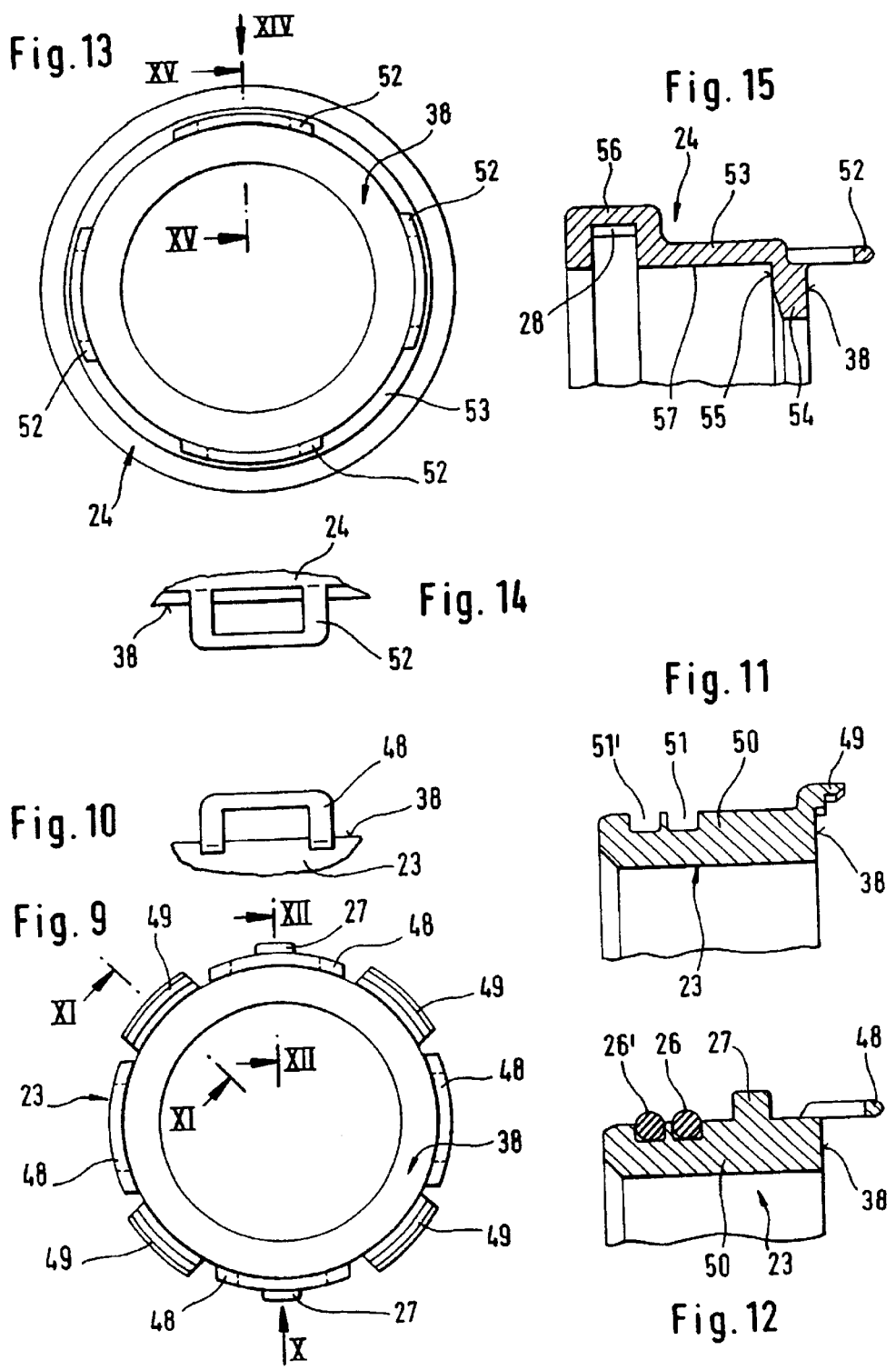

FILTER MODULE

BACKGROUND OF THE INVENTION

1. Field of the Invention

The invention relates to a filter module with several discoid filter cells stacked on top one another which each have a central opening through which at least one element receiving tensile forces extends which with its axial end is connected to closing rings of the filter module having at their end faces a flat packing.

2. Description of the Related Art

In U.S. Pat. No. 5,482,624 a filter module is described which is comprised of several stacked filter cells wherein each filter cell has a central opening. The filter cells are aligned such that the central openings are congruently placed above one another. At the upper and lower end a respective closing ring is arranged which supports a sealing ring so that the filter module can be connected sealingly to a connecting tube or another filter module. Tie rods in the form of strips of stainless steel extend through the central openings of all filter cells of a filter module and are connected respectively to the closing rings provided at the ends.

In DE 295 20 418 U1 a filter device for the treatment of liquids is described in which two filter modules are arranged above one another in a pressure container. These filter modules are comprised of several stacked discoid filter cells wherein at the respective axial end faces of the filter modules closing rings with seals are provided. For positioning the central channels within the interior of the filter modules centering means are provided which respectively engage in the ends of the closing rings of neighboring filter modules.

In DE 40 26 934 C2 a central support tube for the filter modules is described which is designed for receiving filter cells. At the respective ends of the central support tube adaptors are provided wherein one adaptor has a seal comprising two O-rings. The other adaptor forms an exact counter piece, i.e., it is configured to receive a further adaptor, for example, of the next filter module where again two O-rings are provided as a sealing arrangement. The adaptors are provided with a bayonet closure for a mechanically stable connection of the adaptors of two neighboring filter modules.

Moreover, filter modules with flat adaptors are known which have closing rings with flat packings. These modules can be stacked within a filter housing wherein in the filter housing a centrally arranged tube is provided in order to realize the required positional securing action for the arrangement. A compression device is provided at the upper end in order to provide a sufficient sealing action between the individual modules or the connectors at the ends of the arrangement.

SUMMARY OF THE INVENTION

It is an object of the present invention to further develop a filter module of the aforementioned kind such that the filter module can be universally employed in filter systems with different connecting systems by means of simple measures.

The filter module according to the present invention is characterized in that the closing rings are connectable to one adaptor, respectively, wherein the adaptor has a hollow-cylindrical portion for connection to a further liquid-conveying component and has a sealing surface that provides axial contact and can be pressed against the flat packing.

The essential advantages of the invention can be seen in that a standardized module can be combined with any type of connecting system and therefore special variants requested by the customer can be realized in a simple manner. This standardization effect results in a simplification of the manufacturing process and a cost reduction because of higher output numbers. A further cost reduction can be achieved in the area of logistics and storage because it is no longer required to stock a plurality of models with different connecting geometries.

Further advantages can be seen in that the filter module is centered by the adaptors and that expediently the closing rings are locked at the adaptors. Thus, a central guiding tube, above which the filter modules must be lifted during mounting and disassembly, is no longer needed. Also, a compression device for tightening the module seals is no longer needed so that this results in a cost advantage. With the inventive arrangement it is also possible to provide back-washing since a reliable sealing action of all connections is provided.

So that a force loading of the filter modules in the axial direction is not required in order to provide a reliable sealing action of the adaptor with the adjacent connecting component, the seals should be provided within the hollow-cylindrical portion of the adaptor. In order for the adaptors, provided at two filter modules to be connected or at a connecting component, to be connectable to one another, it is therefore expedient that a first adaptor has an adaptor pin which at its mantle surface is provided with at least one, preferably however two, axially spaced O-rings while a second adaptor has an adaptor sleeve which at its inner wall is designed as a sealing surface. In order to limit the insertion depth of the adaptor pin into the adaptor sleeve, a radially inwardly oriented stop surface is provided.

The adaptors preferably have at their hollow cylindrical portion means for a positive-locking connection with a further liquid-conveying component or an adjacently positioned adaptor wherein it is expedient to provide the connecting means in the form of a bayonet closure. Such a bayonet closure provides for a fast mounting, and the parts are reliably secured in their relative position to one another.

For a simple and inexpensive mounting it is suggested that the first or second adaptors are connectable by snap or clip connections to the closing rings. Such snap or clip arrangements can be produced with negligible expenditure during manufacture of the adaptors and provide a sufficient stability in order to transmit the compressing forces with which the flat packing is loaded at the closing ring. Expediently, the connecting means are comprised of locking brackets at the outer circumference of the radial sealing surface, and projections of the closing ring will snap into place in the locking brackets upon connecting the adaptors to the closing ring. In this way the adaptor can be fastened to the closing rings without employing tools. This is especially advantageous during installation on site, i.e., during installation at a client site. For a secure positioning, the flat packing is inserted into an annular groove provided at the end face of the closing ring. The annular groove as well as the flat packing expediently have a substantially rectangular cross-section. In order to achieve a self-reinforcing sealing action at the sealing ring with increasing liquid pressure, the sealing ring is formed such that at its end faces two sealing lips are formed, respectively. These sealing lips are formed substantially by annular grooves which extend along the inner and outer mantle surfaces of the sealing ring. Such a four-lip sealing ring allows a reliable sealing action of the connection with only a minimal compression force on the adaptor. Since the four-lip flat packing does not completely fill the annular groove and since, accordingly, the inclusion of an air cushion within the dead space of the annular groove cannot be excluded, it is suggested that an opening is provided in the closing ring which connects the annular recess in the vicinity of its bottom with the central opening of the closing ring.

BRIEF DESCRIPTION OF THE DRAWING

Embodiments of the invention will be explained in the following with the aid of the drawing. The drawing shows in:

FIG. 9 a view of a first adaptor in the axial direction;

FIG. 10 a view of a locking bracket according to arrow X of FIG. 9;

FIG. 11 a section along the line XI—XI of FIG. 9;

FIG. 12 a section along the line XII—XII of FIG. 9;

FIG. 13 a view of a second adaptor in the axial direction;

FIG. 14 a view of a locking bracket according to arrow XVI in FIG. 13;

FIG. 15 a section along the line XV—XV in FIG. 13;

DESCRIPTION OF THE PREFERRED EMBODIMENTS

Figure 1:
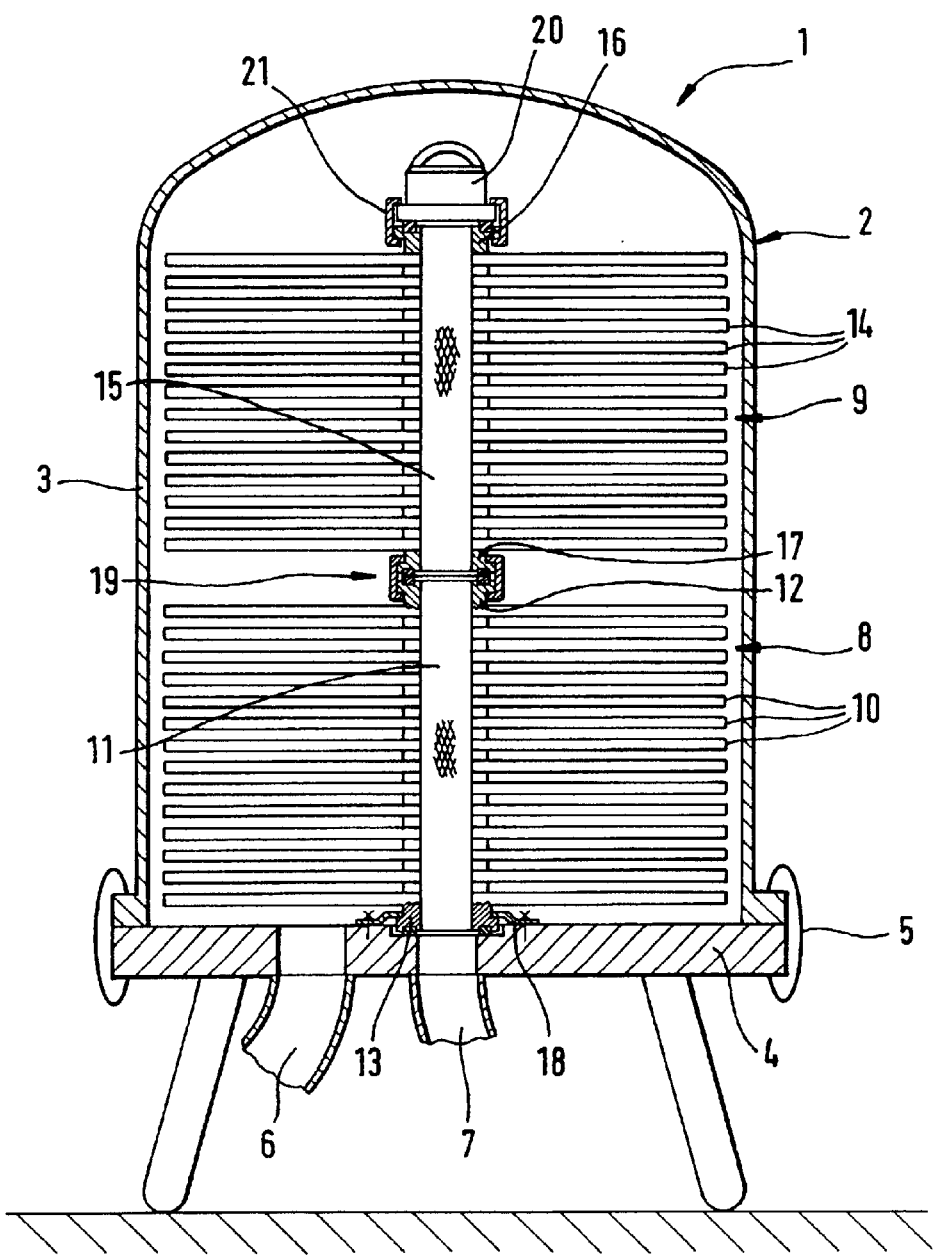
FIG. 1 a schematic representation of a longitudinal section of a filter arrangement.

In FIG. 1 a longitudinal section of a filter arrangement 1 is schematically represented. The filter arrangement 1 comprises a container 2 which comprises a container housing 3 and a container bottom 4. The container housing 3 and the container bottom 4 are closed pressure-tightly by a housing closure 5. The container bottom 4 is provided with a connecting pipe 6 which is, for example, the inlet for the unfiltered material as well as with a connecting pipe 7 which is an outlet for the filtrate. The opening of the connecting pipe 7 is arranged centrally within the container bottom 4.

Two filter modules 8 and 9 are arranged within the container 2 and are stacked atop one another. Of course, it is also possible to arrange up to four filter modules in a stacked arrangement. The filter module 8 is comprised of a plurality of discoid filter cells 10 stacked on top one another, which each have a central opening so that a central channel 11 is formed within the filter module along the central axis through which the filtrate can flow to the connecting pipe 7. The filter module 8 is provided at its upper axial end with a closing ring 12 and at the lower axial end with a closing ring 13.

The filter module 9 has a configuration which corresponds to that of the filter module 8, i.e., the filter module 9 is comprised of filter cells 14 with a central channel 15, an upper closing ring 16, and a lower closing ring 17. The closing ring 13 of the lower filter module 8 rests with interposition of a corresponding seal against a flange surface of the container bottom 4 and is secured by a fastening arrangement 18 on the container bottom 4. The fastening arrangement 18 can be, for example, a bayonet socket or flange ring. However, other fastening means, which can be easily mounted and provide secure holding and reliable sealing even when inner pressure forces occur, can be considered.

The upper closing ring 12 of the lower filter module 8 and the lower closing ring 17 of the upper filter module 9 are secured by an adaptor 19. The adaptor 19 has contact surfaces for the respective seals of the closing rings 12 and 17. The adaptor 19 will be explained in more detail infra. A closure cap 20 is placed onto the upper closing ring 16 and rests against the sealing ring arranged within the closing ring 16. In order to secure the closure cap 20 on the closing ring 16 with a corresponding pressure force, an adaptor 21 is provided whose shape matches that of the adaptor 19.

Figure 2:
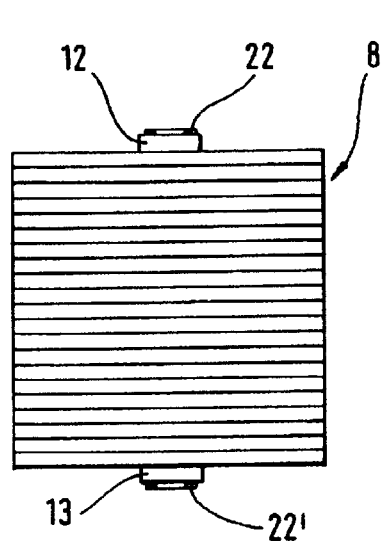
FIG. 2 a schematic representation of a filter module.

FIG. 2 shows a schematic representation of the filter module 8 wherein the end faces of the closing rings 12 and 13 have respectively a flat packing 22, 22' arranged thereat.

Figure 3:
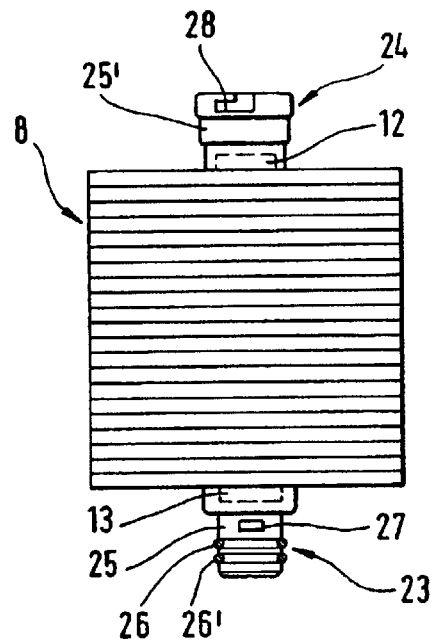
FIG. 3 a filter module according to FIG. 2 with adaptors mounted thereon.

FIG. 3 shows the filter module 8 with adaptors 23 and 24 connected to the closing rings. At the lower end of the filter module 8 a first adaptor 23 is provided which is fastened to the closing ring 13 and comprises a hollow-cylindrical portion 25 having arranged at its mantle surface two O-rings 26 and 26'. Furthermore, a projection 27 is provided on the hollow-cylindrical portion 25 which projects from the mantle surface of the hollow-cylindrical portion 25 and is provided for engagement in a corresponding cutout of a counter piece. At the upper closing ring 12 of the filter module 8 a second adaptor 24 is fastened which has a hollow-cylindrical portion 25' whose inner radial dimension is such that receiving a corresponding counter piece, for example, a hollow cylindrical portion 25 of the adaptor 23 is possible. Accordingly, the second adaptor 24 has a cutout 28 in its wall which extends first axially and then in the circumferential direction so that in cooperation with the projection 27 of a first adaptor 23 inserted into the second adaptor 24 a connection by bayonet closure is realized.

Figure 4:
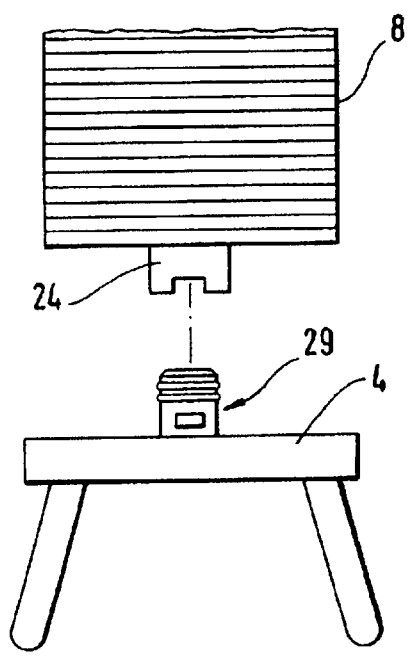
FIG. 4 a schematic representation of the bottom of a filter housing with a filter module to be arranged thereon.

FIG. 4 shows a schematic representation of the container bottom 4 with a connecting component 29 arranged thereon which corresponds to the first adaptor 23 of FIG. 3 with regard to its size and shape. In this way, a filter module 8 provided with a second adaptor 24 can be fastened without problems on the container bottom 4 and connected in a liquid-tight manner.

Figure 5:
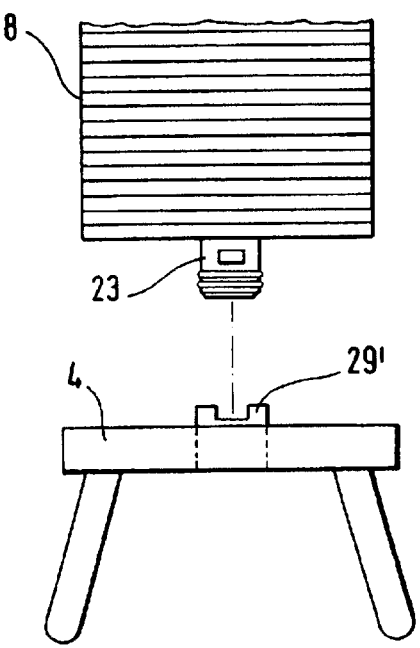
FIG. 5 an embodiment variant of FIG. 4

Inasmuch as the container bottom 4, as shown in the embodiment of FIG. 5, is provided with a connecting component which has substantially the shape and size of the second adaptor 24 illustrated in FIG. 3, the filter module 8 is then provided with a first adaptor 23 and in this way can be easily arranged on and connected to the container bottom 4.

Figure 6:
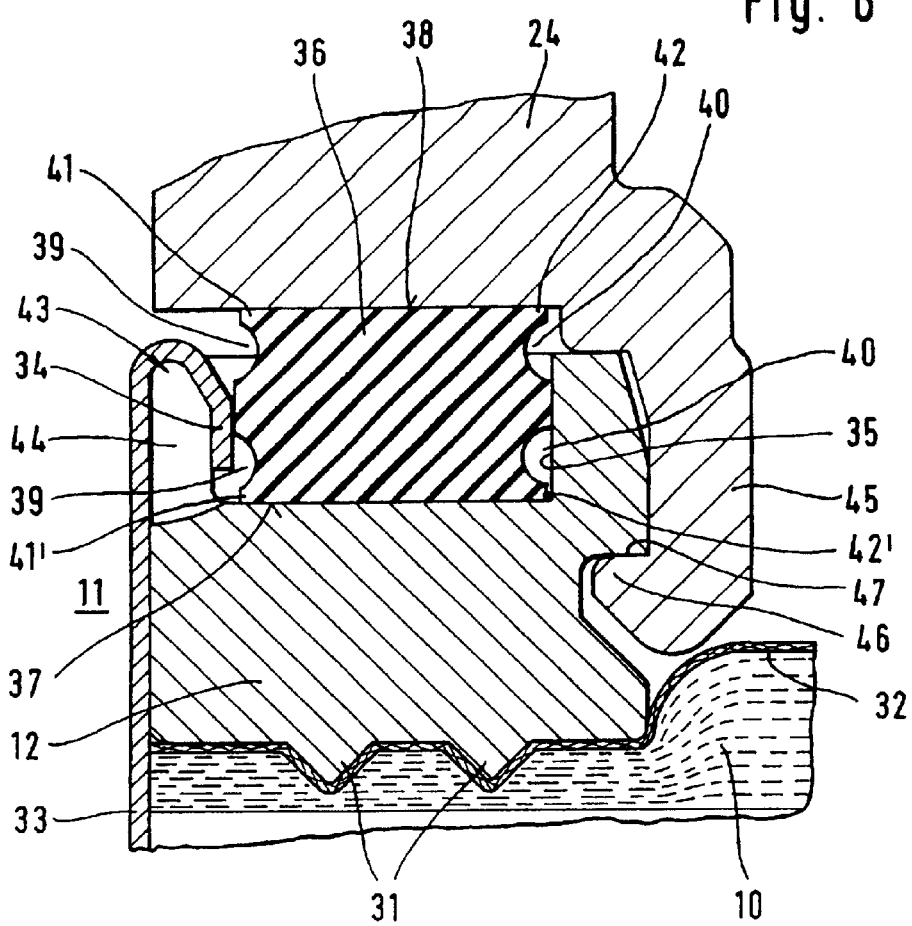
FIG. 6 an enlarged representation of a detail of the connecting ring with flat packing and fastened adaptor.

FIG. 6 shows an enlarged representation of a portion of the closing ring 12 with adaptor 24 connected thereto wherein only the lower area as well as the fastening means of the adaptor are represented. The closing ring 12 has at its end face facing the filters cell 10 two annular projections 31 which are pressed into the filter cell 10. The filter cell 10 and the filter fleece 32 enclosing it curve upwardly radially externally to the closing ring 12, i.e., external to the closing ring 12 the filter cell 10 has a greater axial thickness than in its area clamped between the closing ring 12 and the adjacently arranged filter cells. The filter cells of the filter module are tied together by a tie rod 33. The tie rod 33 is comprised of stainless steel and is preferably embodied as a sleeve having a plurality of openings. The ends of the tie rod 33 are substantially U-shaped wherein the leg 34 of the U-shape engages an end face recess of the closing ring 12.

The end face recess of the closing ring 12 is formed as an annular groove 35 which is substantially of a square cross-section and serves as a receiving means for a flat packing 36 which is clamped between a groove bottom 37 of the annular groove 35 and a sealing surface 38 of the second adaptor 24 serving as an axial contact surface. At the inner mantle surface as well as at the outer mantle surface the flat packing 36 has respectively two annular grooves 39 and 40 so that on the side of the flat packing 36 resting against the groove bottom 37 and on the side of the flat packing resting against the axial sealing surface 38 of the second adaptor 24 two sealing lips 41, 41 ' and 42,42' are formed, respectively. Accordingly, a four-lip seal results.

Between an upper edge 43, which is embraced by the tie rod 33, and the groove bottom 37 of the annular groove 35 a radially extending slot is provided which extends from the inner circumferential surface of the annular groove 35 to the central opening of the closing ring 12, which is part of the central channel 11 shown in FIG. 1. The slot forms an opening 44 which connects the annular groove 35 in the vicinity of its groove bottom 37 with the central opening in the closing ring 12. The adaptor 24 is laterally provided with a locking arm 45 which extends in the axial direction radially outside of the closing ring 12 and engages with its catch hook 46 behind a radial edge 47 of the closing ring 12.

Figure 7:
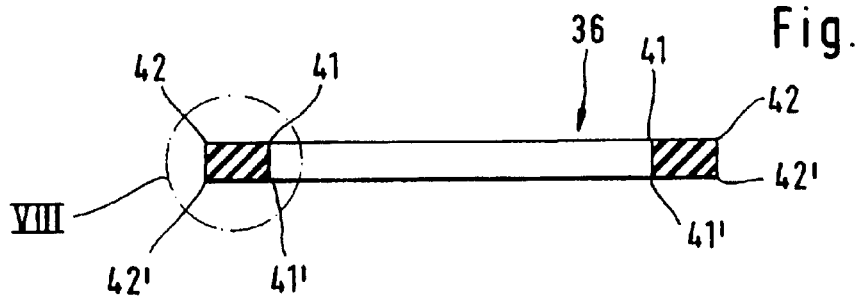
FIG. 7 a section of the flat packing.

FIG. 7 shows a section of a flat packing 36 as an individual part, illustrating the sealing lips 41, 41', 42, 42' extending along the circumferential surfaces.

Figure 8:
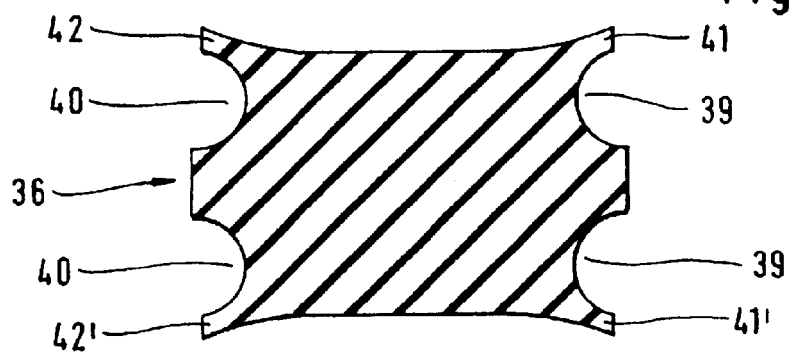
FIG. 8 an enlarged representation of the unit VIII in FIG. 7.

FIG. 8 shows an enlarged representation of a detail VIII of FIG. 7 illustrating that in its unloaded state the four-lip flat packing 36 has a greater expansion in the axial direction than in the finish-mounted state. FIG. 8 illustrates especially that the sealing lips 41, 41', 42, 42' provided at the flat sides are bent slightly outwardly of the upper and lower plane so that in the mounted state of the flat packing 36 a pretension is generated by the corresponding contact surfaces (groove bottom 37 and sealing surface 38 according to FIG. 6) which secures the sealing lips 41, 41', 42, 42' in a safe and reliably sealing contact at the sealing surfaces at all times.

FIG. 9 shows an end view of the first adaptor 23 in the axial direction. This illustration shows the axial sealing surface 38 which is provided in the same configuration in both adaptor types. Radially outwardly of the sealing surface 38 four locking brackets are provided uniformly distributed about the circular circumference. Their shape can be seen especially in FIG. 10. FIG. 10 shows also that the locking brackets 48 project past the sealing surface 38. Moreover, between two respective locking brackets 48 axial projections are provided which extend radially externally to the sealing surface 38 and provide a central alignment during fastening on the closing ring 13 in FIG. 3. Radial projections 27, already mentioned in connection with FIG. 3, are provided at two locations which are diametrically opposed to one another. Relative to the axial extension of the adaptor 23, they are positioned in a different plane than the locking brackets 48, as can be seen clearly in FIG. 12.

In FIGS. 11 and 12 axial sections of the adaptor 23 are respectively illustrated which show that the adaptor 23 is comprised substantially of an adaptor pin 50 having the sealing surface 38 at its end face. In the vicinity of the other axial end of the adaptor pin 50 two annular grooves 51, 51' are arranged in the mantle surface at minimal axial spacing to one another, as is illustrated in FIG. 11. While FIG. 11 shows the adaptor pin 50 without sealing rings, FIG. 12 shows the O-rings 26, 26' inserted into the annular grooves 51, 51'. The O-rings seal the adaptor 23 in its counter piece.

FIG. 13 shows a view of the second adaptor 24 in the axial direction. This Figure shows that four locking brackets 52 are uniformly distributed radially externally to the sealing surface 38 at its circumference. They have a shape as illustrated in FIG. 14. FIG. 15 is an axial section of the second adaptor 24 which shows that it is comprised substantially of an adaptor sleeve 53 whose inner wall 57 serves as a sealing surface for a component to be received in the adaptor sleeve. The adaptor sleeve has an inwardly oriented flange 54 at one of its axial ends. Its axially outer side forms the sealing surface 38 and its axially inwardly positioned side serves as a stop surface 55 for the insertion of the further component, for example, a first adaptor 23. In the vicinity of the other axial end of the adaptor sleeve 53 a further portion 56 is provided in which the cutout 28 (as shown in FIG. 3) is arranged which receives the projection 27 of the first adaptor 23. In this way, the first adaptor 23 and the second adaptor 24 can be connected to one another in the manner of a bayonet closure.

Figure 16:
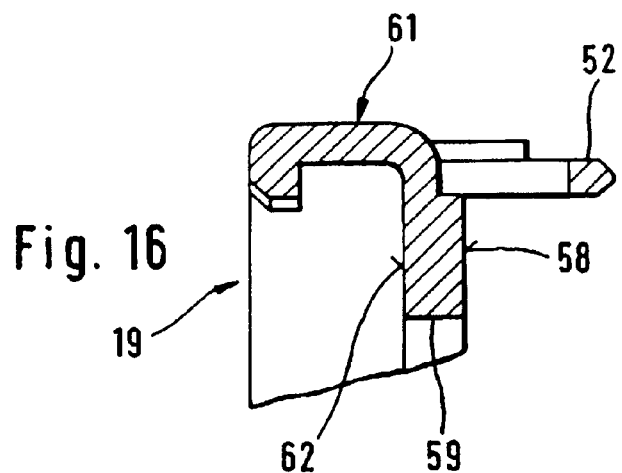
FIG. 16 an adaptor for coupling two connecting rings according to FIG. 1.

FIG. 16 shows an axial section of the adaptor 19 which has a sealing surface 58 at a radial collar 59 facing inwardly, wherein the sealing surface 58 serves as an axial contact for the sealing ring 36. A hollow-cylindrical portion 61 is connected to the radial collar 59. It is designed similarly to portion 56 in FIG. 15 and represents a part of a bayonet closure. The counter piece of the bayonet closure is formed by the projections on the mantle surface of the closing ring 17 in FIG. 1. In the mounted state the seal of the closing ring 17 is axially force-loaded against the sealing surface 62 of the radial collar 59. For connecting the adaptor 19 to the closing ring 12 in FIG. 1, locking brackets 52 are provided which correspond to those of FIGS. 14 and 15.

Figure 17:
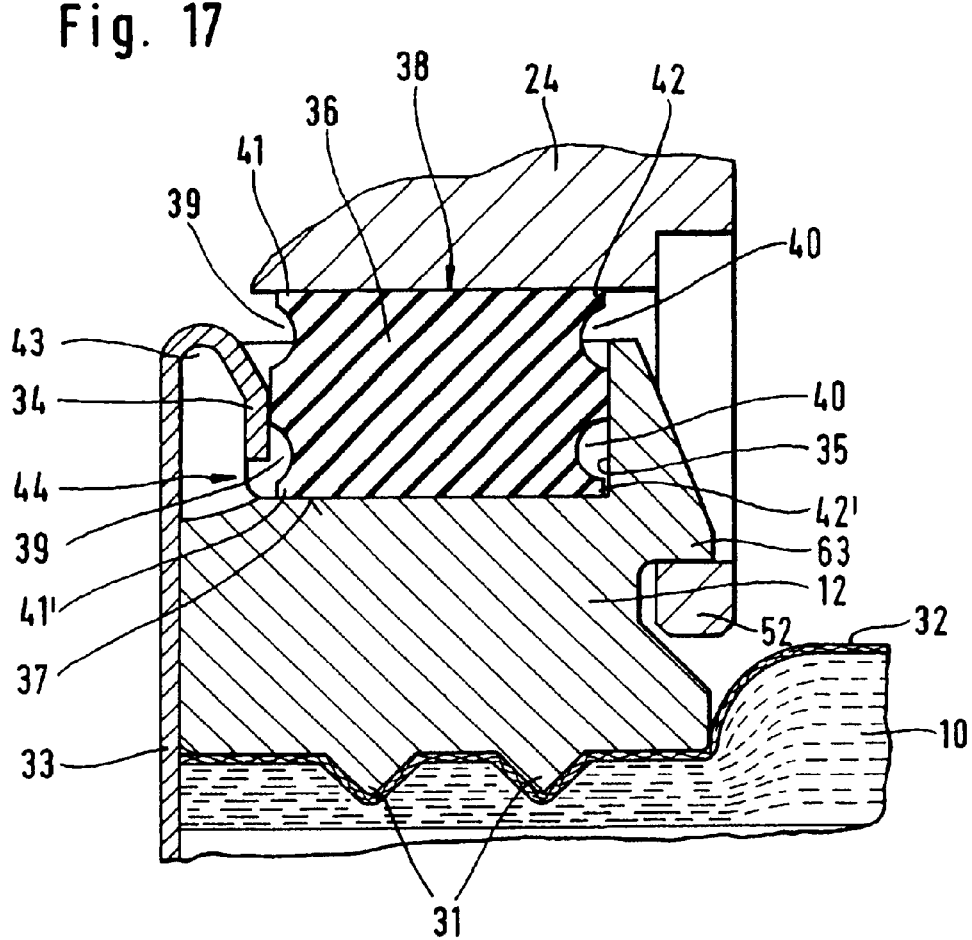
FIG. 17 an embodiment variant of FIG. 6.

For attaching the first adaptor 23 or the second adaptor 24 to a closing ring 12 for 13, ramp-like noses 63 are arranged on the outer circumferential surface of the closing ring 12 or 13, and the locking brackets 48 or 52 glide along these noses when placing the adaptor 23 or 24 axially onto the closing ring and snap into place behind edges of the noses. This connecting arrangement is represented in FIG. 17. The other reference numerals correspond to those of FIG. 6 so that reference is being had to that description in order to avoid repetition.

What is claimed is:

1. A filter module comprising:

several discoid filter cells (10, 14) each having a central opening and stacked to form a stacked filter cell arrangement (8, 9) wherein said central openings are aligned in an axial direction of said stacked filter cell arrangement (8, 9);

closing rings (12, 13, 16, 17) connected to opposed ends of said stacked filter cell arrangement (8, 9) and having a central opening aligned with said central openings of said filter cells (10, 14);

at least one tensile forces receiving element (33) extending through said central openings of said filter cells (10, 14) and said closing rings (12, 13, 16, 17) and having axial ends connected to said closing rings (12, 13, 16, 17);

said closing rings (12, 13, 16, 17) having outwardly facing end faces each having a flat packing (22, 22', 36);

adaptors (19, 23, 24) having a hollow-cylindrical portion (25, 25', 61) configured to be connected to a further liquid-conveying component (17; 23, 24; 29, 29') and having an axial sealing surface (38, 58);

said adaptors (19, 23, 24) configured to be connected to said closing rings (12, 13, 16, 17) such that said sealing surface (38, 58) presses axially against said flat packing (22, 22', 36).

2. The filter module according to claim 1, wherein said hollow cylindrical portion (25) of a first one of said adaptors (23) has an adaptor pin (50) and said adaptor pin (50) has a mantle surface with at least one O-ring (26, 26') positioned thereon.

3. The filter module according to claim 2, wherein two of said O-rings (26, 26') are positioned with axial spacing to one another on said mantle surface.

4. The filter module according to claim 2, wherein said hollow-cylindrical portion (25') of a second one of said adaptors (24) is an adaptor sleeve (53) having an inner wall comprising a sealing surface (57) and a radially inwardly oriented stop surface (55).

5. The filter module according to claim 1, wherein said adaptors (19, 23, 24) have locking elements (27, 28) provided at said hollow-cylindrical portions (25, 25' or 50, 53, 61), wherein said locking elements (27, 28) are configured to engage positive-lockingly a further liquid-conveying component.

6. The filter module according to claim 5, wherein said locking elements (27, 28) form a bayonet closure.

7. The filter module according to claim 1, wherein said adaptors (19, 23, 24) are configured to be fastened by a snap connection or clip connection to said closing rings (12, 13, 16, 17).

8. The filter module according to claim 7, wherein at least two locking brackets (48, 52) are arranged at an outer circumference of said axial sealing surface (38, 58) of said adaptors (19, 23, 24) and wherein said closing rings (12, 13, 16, 17) have projections (63) configured to snap into said locking brackets (48, 52) when said adaptors (23, 24) are connected to said closing rings (12, 13, 16, 17).

9. The filter module according to claim 8, wherein said projections (63) are noses having ramps.

10. The filter module according to claim 1, wherein at least two locking arms (45) extending in said axial direction are arranged at an outer circumference of said axial sealing surface (38, 58) of said adaptors (19, 23, 24), said locking arms (45) having catch hooks (46), wherein said closing rings (12, 13) have a radial edge (47), and wherein said catch hooks (46) are configured to snap into place behind said radial edge when said adaptors (23, 24) are connected to said the closing rings (12, 13).

11. The filter module according to claim 4, wherein said first adaptor (23) is connected to a first one of said closing rings (13, 17) and said second adaptor (24) is connected to a second one of said closing rings (12, 16), wherein said first adaptor (23) has two of said O-rings arranged axially spaced from one another.

12. The filter module according to claim 1, wherein said closing rings (12, 13, 16, 17) and said adaptors (19, 23, 24) are comprised of plastic material.

13. The filter module according to claim 12, wherein said closing rings (12, 13, 16, 17) and said adaptors (19, 23, 24) are comprised of identical plastic material.

14. The filter module according to claim 1, wherein said outwardly facing end faces of said closing rings (12) have an annular groove (35) configured to receive said flat packing (36).

15. The filter module according to claim 14, wherein said annular groove (35) and said flat packing (36) have a substantially rectangular cross-section.

16. The filter module according to claim 15, wherein said flat packing (36) has two opposed end faces and wherein each one of said opposed end faces has two sealing lips (41, 41' and 42, 42').

17. The filter module according to claim 16, wherein said flat packing (36) has an inner mantle surface and an outer mantle surface, wherein said inner and outer mantle surfaces have annular grooves (39, 40) extending circumferentially along said inner and outer mantle surfaces, and wherein said sealing lips (41, 41', 42, 42') are formed by said annular grooves (39, 40).

18. The filter module according to claim 14, wherein said closing rings (12) have an opening (44) connecting said annular groove (35) in the vicinity of a groove bottom (37) of said annular groove (35) with said central opening of said closing rings (12).

* * * * *